(12) United States Patent
Song et al.

(10) Patent No.: US 7,751,321 B2
(45) Date of Patent: Jul. 6, 2010

(54) METHOD AND SYSTEM FOR REMOTE ACCESS TO UNIVERSAL PLUG AND PLAY DEVICES

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 530 days.

(21) Appl. No.: 11/713,516

(22) Filed: Mar. 1, 2007

(65) Prior Publication Data

US 2007/0214241 A1 Sep. 13, 2007

Related U.S. Application Data

(60) Provisional application No. 60/781,475, filed on Mar. 9, 2006.

(51) Int. Cl.
*G06F 15/16* (2006.01)
(52) U.S. Cl. .................. 370/230; 709/217
(58) Field of Classification Search ........ 370/230, 370/401, 465, 466, 467, 252, 255, 389, 390, 370/392, 395.2; 709/217, 218, 219
See application file for complete search history.

(56) References Cited

U.S. PATENT DOCUMENTS

| 6,924,727 | B2 | 8/2005 | Nagaoka et al. |
|---|---|---|---|
| 2006/0031459 | A1 | 2/2006 | Ahn et al. |
| 2006/0037036 | A1* | 2/2006 | Min et al. .................. 725/1 |
| 2006/0153072 | A1* | 7/2006 | Bushmitch et al. ........ 370/230 |
| 2006/0168320 | A1* | 7/2006 | Kidd et al. ................ 709/238 |
| 2006/0168656 | A1 | 7/2006 | Stirbu |
| 2006/0184693 | A1* | 8/2006 | Rao et al. ................. 709/245 |
| 2007/0127394 | A1* | 6/2007 | Stirbu et al. .............. 370/254 |
| 2008/0016255 | A1* | 1/2008 | Saint-Hilaire et al. ....... 710/11 |
| 2008/0112419 | A1 | 5/2008 | Lee et al. |
| 2008/0275940 | A1 | 11/2008 | Yamada et al. |

FOREIGN PATENT DOCUMENTS

KR 10-2004-005464 A 1/2004

OTHER PUBLICATIONS

Notification of Transmittal of the International Search Report and the Written Opinion of the International Searching Authority issued in International Application No. PCT/KR2007/002774 dated Sep. 17, 2007, Republic of Korea.
U.S. Office Action for U.S. Appl. No. 11/805,622 mailed on Aug. 3, 2009.

* cited by examiner

*Primary Examiner*—Brian D Nguyen
(74) *Attorney, Agent, or Firm*—Kenneth L. Sherman, Esq.; Michael Zarrabian, Esq.; Myers Andras Sherman LLP

(57) ABSTRACT

A method and system for remote access to UPnP devices is provided, which allows remote access to UPnP devices in a private network, and utilizes message forwarding at the UPnP layer. Existing UPnP control points can remotely access UPnP devices in a private network without modification to UPnP standards.

30 Claims, 4 Drawing Sheets

METHOD AND SYSTEM FOR REMOTE ACCESS TO UNIVERSAL PLUG AND PLAY DEVICES

RELATED APPLICATION

This application claims priority from U.S. Provisional Patent Application Ser. No. 60/781,475 filed Mar. 9, 2006, incorporated herein by reference.

FIELD OF THE INVENTION

The present invention relates to access to Universal Plug and Play (UPnP) devices.

BACKGROUND OF THE INVENTION

Universal Plug and Play (UPnP) is increasing in importance as a standard for private area networking such as home networking. UPnP, however, does not account for remote access to devices in a private area network over other networks such as the Internet or another private area network.

The Internet enables devices to be connected essentially anywhere at anytime. Utilizing the Internet, users desire to access content/services in private networks such as a home network, and control devices and services in such networks from anywhere (e.g., remotely) and at anytime. As such, there has been a need for an approach that enables UPnP devices on the Internet, or UPnP devices in a private network, or access to UPnP devices in another private network.

The Simple Service Discovery Protocol (SSDP) forms the foundation of the UPnP standard. A first aspect of the SSDP involves service discovery requests. The UPnP control point in a UPnP network multicasts requests to look for any online UPnP devices in the network. The UPnP device listens for such requests, and when it receives such a request, the UPnP device sends a unicast response back to the requesting UPnP control point. The UPnP device also periodically advertises itself by multicasting its presence in the network. When a UPnP control point receives such advertisement, it can consider the advertising UPnP device as online and ready to be used.

The multicast request/unicast response mechanism works reasonably well in a private network, because a private network usually comprises a simple network wherein a multicast message can reach every UPnP device and UPnP control point in the network. If a private network includes multiple subnets, a multicast forwarding module in each of the subnet routers enables multicast messages to travel across subnets and reach every device in the network.

The SSDP protocol breaks down, however, for remote access to UPnP devices in a network, due to security concerns. There are two types of remote access. The first type involves a remote device directly connecting to a private network including a gateway via a secured link (e.g., a Virtual Private Network (VPN) connection). The gateway can be configured such that the remote device that connects to the private network via the secured link becomes a part of the private network (e.g., the remote device is temporarily assigned a private IP address such that it can communicate with other devices in the network via UDP and/or TCP communication directly).

The second type of remote access is to allow devices in one private network to connect to devices in another private network via a secured link (e.g., VPN). This is typically achieved by setting up a secured link between gateways in the two networks such that a gateway that initializes the secured link is temporarily assigned a private IP address by the other gateway. As a result, a gateway in one network can reach any device in the other network.

In remote access cases, security must also be considered. For example, if a homeowner's own mobile device establishes a secured link back to the homeowner's home network, the home owner would desire to "see" and control all available devices in the home network. However, if a guest's mobile device establishes a secured link to a home network, the homeowner would desire to control what devices, services and contents can be "seen" or controlled by the guest. The same security concern applies to a home-to-home scenario, where a home gateway establishes a secured link to a remote home network, such that the remote home network's owner desires to control which devices, services and contents can be seen by the guest.

Such security concerns break down the SSDP discovery protocol, because in the SSDP protocol, a UPnP control point multicasts a request message, and expects a discovered device to respond to the control point directly via a unicast response. This means that multicast messages must be forwarded by the private network gateway, and the remote UPnP control point on a communication link that makes such multicast request can be directly reachable by UPnP devices in the other networks. Such direct reachability makes a private network vulnerable to security attacks because the private network gateway cannot enforce the security policy on the incoming access requests from the remote UPnP control point, and further the gateway cannot enforce security policies for any messages originating from devices in the network and terminating on the remote UPnP control point.

The multicast message forwarding between the remote UPnP control point and UPnP devices in a private network can be enabled by a multicast forwarding module in the private network gateway. For security, such multicast forwarding should be turned off such that the UPnP control point can only discover devices and services in the private network under the control of the network owner. Turning off the multicast forwarding also disables advertisements from UPnP devices in the network from reaching the remote UPnP control point. However, turning off multicast forwarding completely disables the SSDP.

There is, therefore, a need for method and system for remote access to UPnP devices, allowing multicast forwarding such that message forwarding occurs at the UPnP layer instead of at the Internet Protocol (IP) layer, where security policy at the UPnP layer cannot be enforced.

BRIEF SUMMARY OF THE INVENTION

A method and system for remote access to UPnP devices is provided, which allows remote access to UPnP devices in a private network, and utilizes message forwarding at the UPnP layer. Such UPnP layer multicast forwarding provides enforcement of security policy at the UPnP layer, and does not require changes to the UPnP specification.

In one implementation, remote access to a UPnP device, involves providing a proxy and a multicast bridge in a network including a UPnP device. The proxy provides access to the UPnP device over the communication link, by performing message forwarding at the UPnP layer in the network, whereby the UPnP control point accesses the UPnP device via the proxy over the communication link. Message forwarding includes performing UPnP message forwarding such as UPnP SSDP multicast forwarding at the UPnP layer.

These and other features, aspects and advantages of the present invention will become understood with reference to the following description, appended claims and accompanying figures.

DETAILED DESCRIPTION OF THE INVENTION

The present invention provides a method and system for remote access to UPnP devices, such as UPnP devices in a private network or a local area network, such as a home network. Two example implementations of the present invention are described below, wherein multicast forwarding occurs at the UPnP layer instead of the IP layer. Such UPnP layer multicast forwarding provides enforcement of security policy at the UPnP layer and does not require changes to the UPnP specification. Further, existing remote UPnP control points (e.g., on the Internet and/or in other networks) can remotely access devices, services and contents in a private network without modification to UPnP standards. As such, existing UPnP devices can operate without modification within the context of the present invention. Further, multicast forwarding in the private network gateway is not required.

Figure 1:
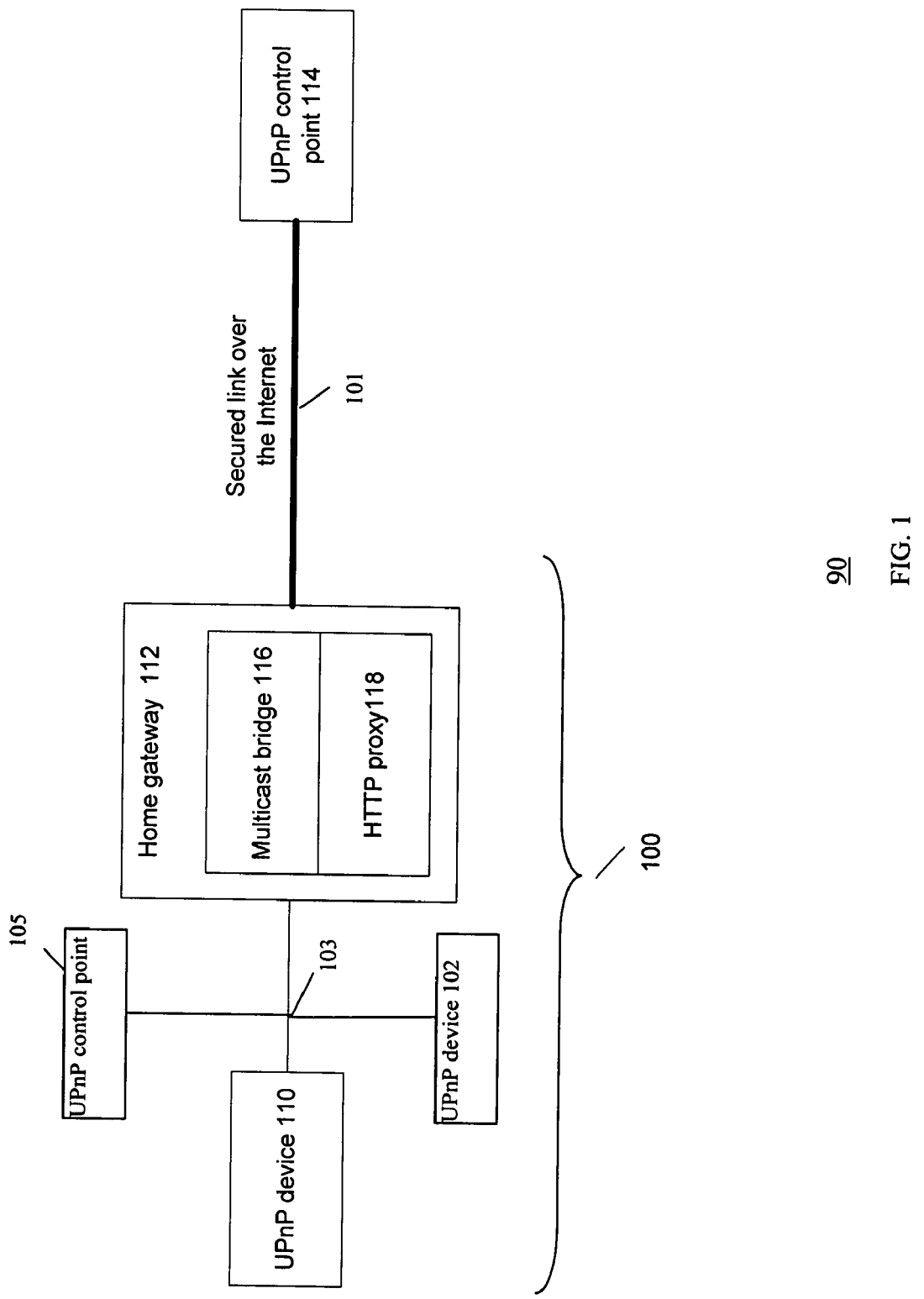
FIG. 1 shows a functional block diagram of an example system which implements remote access to UPnP devices in a private network, according to the present invention.
Figure 2:
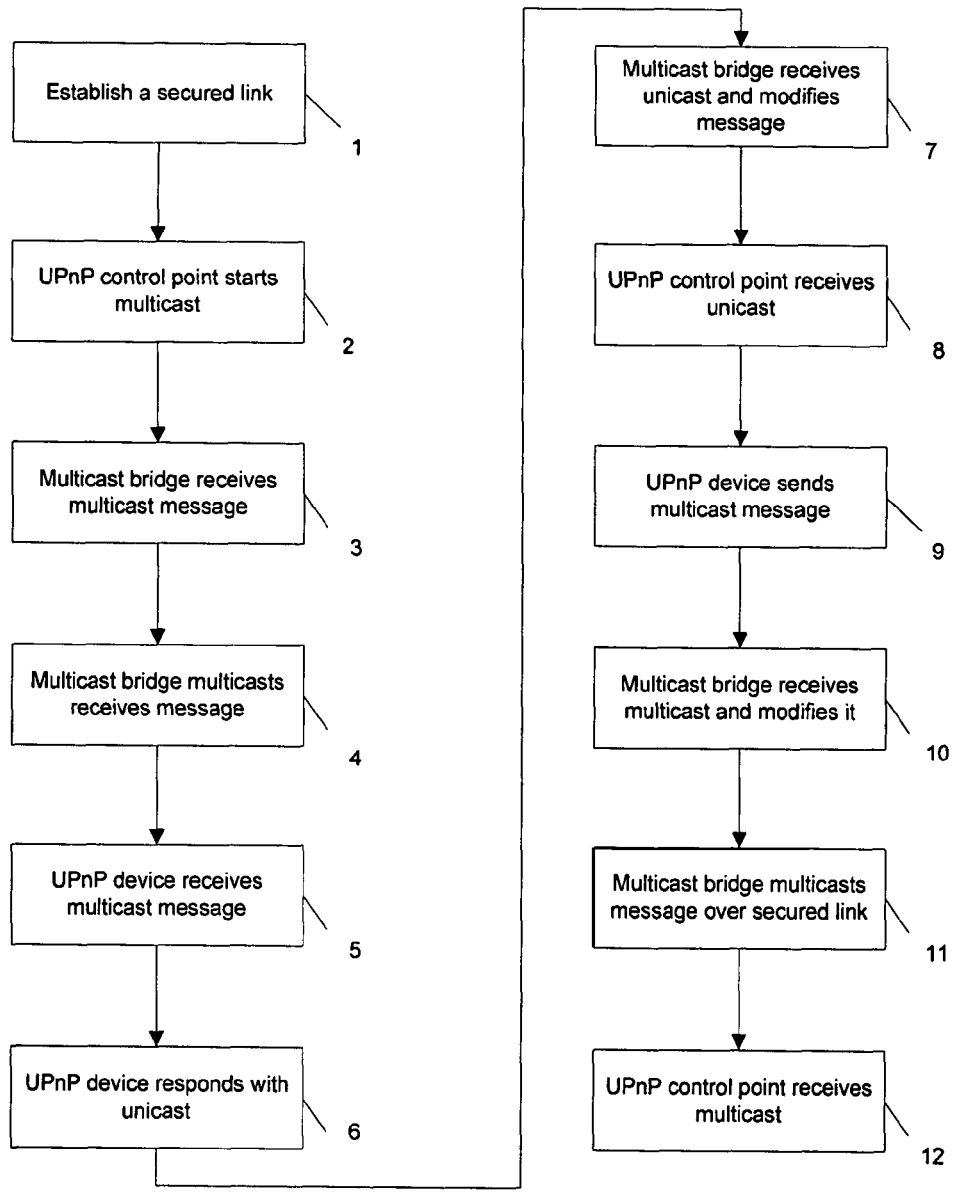
FIG. 2 shows a flowchart of the steps of an example process for remote access to UPnP devices in a private network in FIG. 1, according to an embodiment of the present invention.

Referring to the example functional block diagram in FIG. 1 and the corresponding flowchart in FIG. 2, according to the present invention, an example process of a remote UPnP control point accessing devices in a private network via a communication is now described.

FIG. 1 shows an example system 90 wherein a private network 100 includes at least one UPnP device 110 (e.g., a media server, a consumer electronic device, a PC, etc.) and a gateway 112. The network 100 can include other devices such as another UPnP device 102 and a local UPnP control point 105. The gateway 112 and the UPnP device 110 are connected via a LAN 103, such as Ethernet, 802.11x, etc. A remote UPnP control point 114 can connect to the network 100 via a communication link 101 (e.g., a secured link over the Internet), wherein the control point 114 has a public IP address and can be reached via that public IP address.

The gateway 112 comprises a multicast bridge 116 and an HTTP proxy 118. The multicast bridge 116 functions as a bridge between the home network 100 and the link 101 to the remote control point 114, wherein the bridge 116 forwards a multicast/unicast message from the network 100 through the link 101 and vice versa.

The HTTP proxy 118 relays the UPnP request and response messages (including messages to obtain device and service descriptions, service invocation and eventing) between the remote UPnP control point 114 and the devices in the network 100 (e.g., device 110).

In one example, to access the UPnP device 110 in the network 100, the remote UPnP control point 114 must first send requests to the HTTP proxy 118 wherein the HTTP proxy 118 then forwards the requests to the devices (e.g., UPnP device 110) in the network 100. Optionally, access control measures can be established in the HTTP proxy of each network to enforce security.

Referring to the example process in FIG. 2, the remote UPnP control point 114 accesses the devices in the network 100 according to the following steps:

Step 1: To access the home network 100, the UPnP control point 114 first establishes the communication with the gateway 112 in the network 100.

Step 2: The UPnP control point 114 starts the UPnP discovery process by sending a multicast search (M-SEARCH) message over the link 101, to discover online UPnP devices in the network 100.

Step 3: The multicast bridge 116 receives the multicast message, knowing that the message was sent by the UPnP control point 114 over the link 101. The bridge 116 records the IP address and the port number of the UPnP control point 114 and optionally the type of device/service in the search in a control point list.

Step 4: The multicast bridge 116 multicasts the message through the LAN 103 in the network 100.

Step 5: The UPnP device 110 receives the message from the multicast bridge 116.

Step 6: The UPnP device 110 responds with a message back to the multicast bridge 116.

Step 7: Based on the multicast search message, the multicast bridge 116 determines if the UPnP control point 114 is searching for the type of UPnP device 110 that responded with the message. If so, then the multicast bridge 116 modifies a "LOCATION" header of the received message such that the header contains a URL link that points to the HTTP proxy 118. The multicast bridge 116 examines the recorded control point list. For each control point in the list that is waiting for responses, the multicast bridge 116 modifies a "LOCATION" header of the received message such that the header contains a URL link that points to the HTTP proxy 118. The multicast bridge 116 then sends the modified response back to the UPnP control point 114 via the link 101.

Step 8: The UPnP control point 114 receives the message from the multicast bridge 116, and follows the URL link in the "LOCATION" header of the message to send a HTTP request for the device description of the UPnP device 110 from the network 100. Upon receiving such a request, the HTTP proxy 118 obtains the device description from the UPnP device 110. Upon receiving the description, the HTTP proxy 118 examines the device description, and modifies the base URL, the service control URL, the service description URL and the service event subscription URL, such that they all point to the HTTP proxy 118 instead of the UPnP device 110. After modification, the HTTP proxy 118 sends the description back to the remote UPnP control point 114. Thereafter, the remote UPnP control point 114 may further obtain the service description contained in the UPnP device 110 following the same steps as above. After obtaining the device and service description, the remote UPnP control point 114 invokes services on the UPnP device 110, wherein message traffic between the remote UPnP control point 114 and the UPnP device 110 is routed by the HTTP proxy 118 as described above.

Step 9: Periodically, and independently from any UPnP control points, the UPnP device 110 advertises its presence by a multicast "NOTIFY" message in the network 100.

Step 10: When the multicast bridge 116 receives the multicast message from the UPnP device 110, the multicast bridge 116 modifies the "LOCATION" header in the message such that the URL link in the header points to the HTTP proxy 118 instead of the UPnP device 110.

Step 11: The multicast bridge 116 then sends the modified message over the link 101 to the remote UPnP control point 114.

Step 12: The UPnP control point 114 receives the message, and may then follow the URL link in the "LOCATION" header to send a HTTP request for the device description of the UPnP device 110 from the network 100. Upon receiving such request, the HTTP proxy 118 obtains the device description from the UPnP device 110. The HTTP proxy 118 examines the device description, and modifies the base URL, the service control URL, the service description URL and the service event subscription URL, such that they all point to the HTTP proxy 118 instead of the UPnP device 110. Then, the HTTP proxy 118 sends the modified device description to the control point 114 over the link 101. The remote UPnP control point 114 may further obtain the service description contained in the UPnP device 110. After obtaining the device and/or service descriptions for the UPnP device 110, the control point 114 invokes services on the UPnP device 110 by sending invocation messages to the UPnP device 110, wherein the messages are routed by the HTTP proxy 118.

Figure 3:
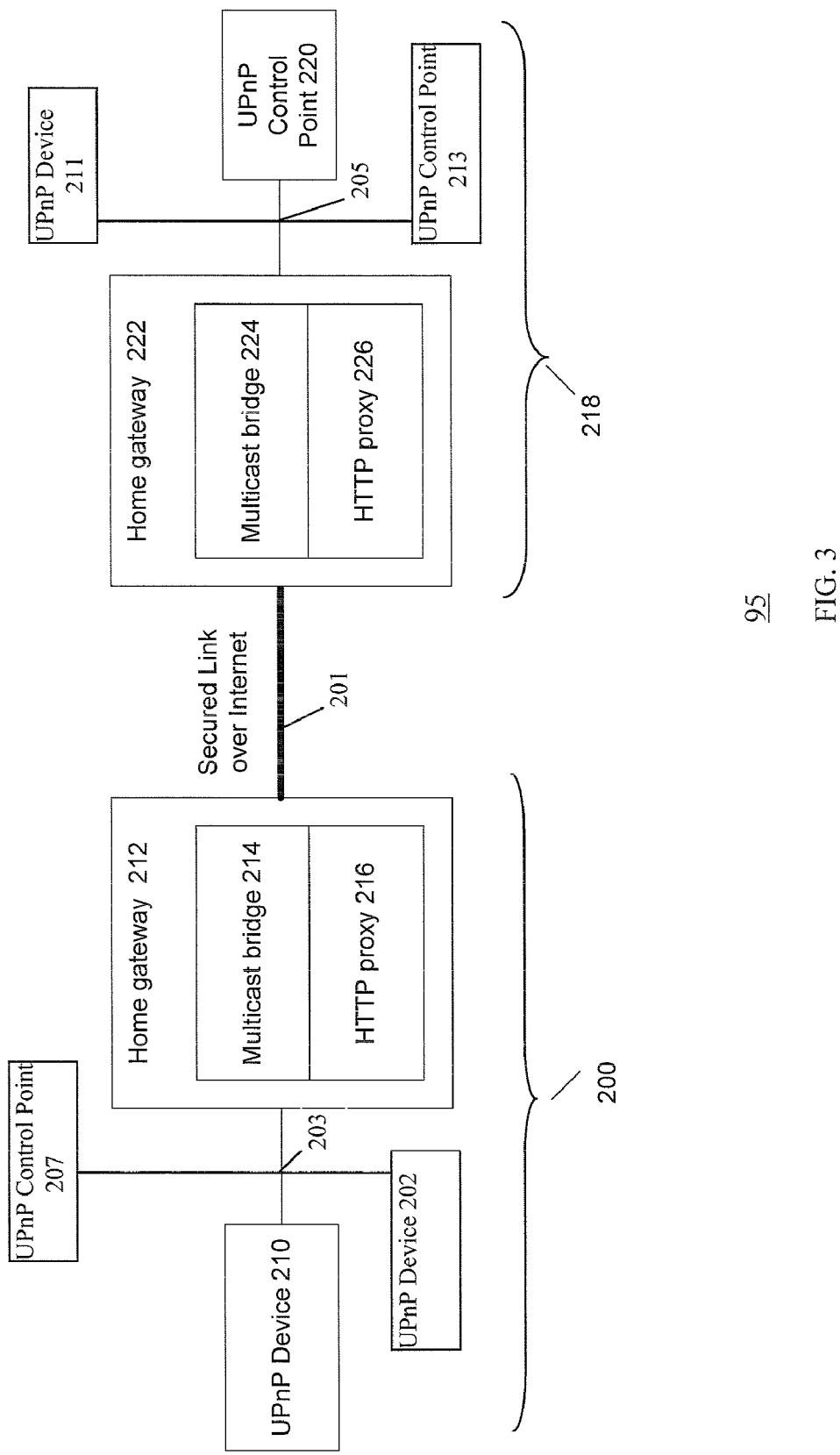
FIG. 3 shows a functional block diagram of another example system which implements remote access to UPnP devices, wherein the UPnP control point in one network connects to another network for remote access, according to the present invention.
Figure 4:
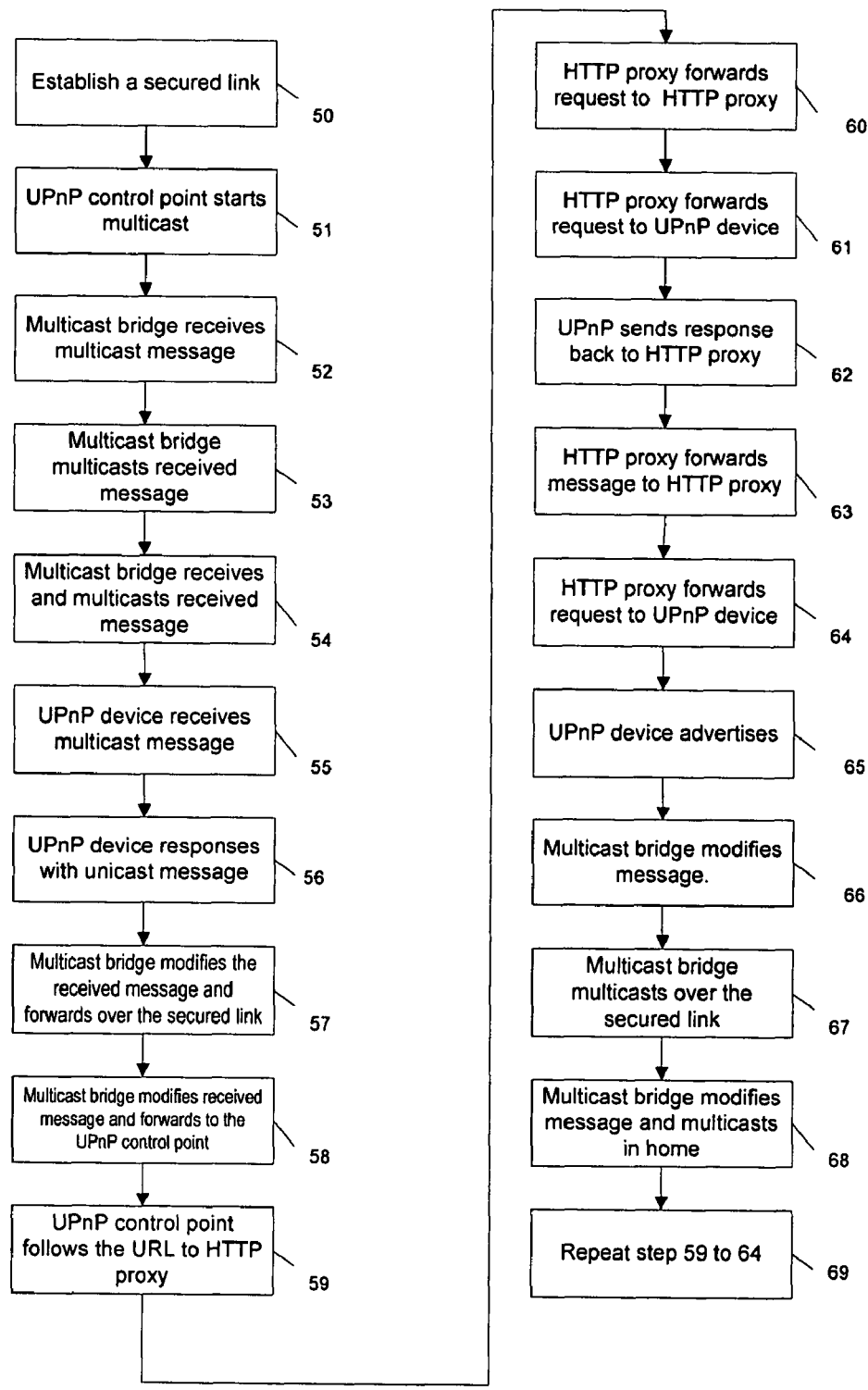
FIG. 4 shows a flowchart of the steps of an example process remote access to UPnP devices in FIG. 3, according to the present invention.

Referring to the example functional block diagram in FIG. 3 and the corresponding process in FIG. 4, another example implementation of the present invention provides a network-to-network remote access for UPnP devices. In the example system 95 shown in FIG. 3, a first private network 200 communicates with a second private network 218 via a communication link 201.

The private network 200 includes UPnP devices 202 and 210, a local UPnP control point 207 and a gateway 212. The gateway 212 includes a multicast bridge 214 and a HTTP proxy 216. The multicast bridge 214 functions as a bridge that forwards multicast and unicast messages in and out of the network 200. A HTTP proxy 216 that hides the devices in the network 200 (including the UPnP devices 210 and 202) from direct access, by remote UPnP control points in another network. In this example, the UPnP devices 202, 210 and the gateway 212 are connected via a LAN 203 (e.g., Ethernet, 802.11x, etc). The gateway 212 is connected to the second network 218 via the link 201.

As shown in FIG. 3, the second network 218 includes at least a UPnP device 211, UPnP control points 213 and 220 and a gateway 222. Similar to the gateway 212, the gateway 222 includes: (1) a multicast bridge 224 that functions as a bridge that forwards multicast and unicast messages in and out of the network 218, and (2) a HTTP proxy 226 that hides the devices in the network 218 from direct access by UPnP control points in other networks. In this example, the multicast bridges and the HTTP proxies in the networks 200 and 218 are similar.

The gateway 222 and the UPnP control point 220 are connected via a LAN 205, such as Ethernet, 802.11x, etc. The gateway 222 can connect to the first network 200 via the link 201, such as over the Internet.

As in the embodiment described in relation to FIGS. 1-2, proactive search messages from the UPnP control point 220 in the second network 218 are forwarded to the devices in the first network 200 by the multicast bridges 224 and 214. During message forwarding, each of the multicast bridges 224 and 214 modifies the message "LOCATION" header to point to its corresponding HTTP proxies 216 and 226, respectively. Likewise, device advertisement messages from devices in the first network 200 are also forwarded by the multicast bridges 224 and 214. During forwarding, each of the multicast bridges 224 and 214 modifies the message "LOCATION" header to point to its corresponding HTTP proxies 216 and 226 respectively. Requests to obtain device/service descriptions, messages for service invocation from the UPnP control point 220 to devices in the first network 200, and event messages from devices in the first network 200 to the UPnP control point 220 are forwarded by the HTTP proxies 216 and 226.

As noted above, FIG. 4 shows a flowchart of a process for remote access implemented in the system 95 of FIG. 3, including the steps of:

Step 50: To access the network 200, the gateway 222 in the network 218 first establishes the link 201 (e.g., via the Internet) to the gateway 212.

Step 51: The UPnP control point 220 in the network 218 starts the UPnP discovery process by multicasting a multicast message (M-SEARCH) message.

Step 52: The multicast bridge 224 receives the multicast message, knowing that the message originates from the UPnP control point 220. The bridge 224 records the IP address and the port number of the UPnP control point 220 and optionally the type of device/service in the search in a control point list.

Step 53: The multicast bridge 224 sends the message over the link 201.

Step 54: The multicast bridge 214 receives the message from the multicast bridge 224, and multicasts the message in the network 200.

Step 55: The UPnP device 210 in the network 200 receives the message.

Step 56: The UPnP device 210 responds with a message back to the multicast bridge 214.

Step 57: The multicast bridge 214 receives the message, and modifies the "LOCATION" header in the message such that the header contains the URL that points to the HTTP proxy 216. The bridge 214 then forwards the message back to the multicast bridge 224.

Step 58: The multicast bridge 224 examines the recorded control point list. For each UPnP control point in the list that is searching for the same type, the multicast bridge 224 modifies the "LOCATION" header of the response message such that the header contains a URL link that points to the HTTP proxy 226. After modification of the response message, the multicast bridge 226 sends the modified response message back to the UPnP control point 220.

Step 59: The UPnP control point 220 receives the message and follows the URL link in the message "LOCATION" header to make a HTTP request to obtain a device description of the UPnP device 210.

Step 60: The HTTP proxy 226 receives the request, and forwards the request to the HTTP proxy 216 via the link 201.

Step 61: The HTTP proxy 216 receives the request and forwards it to the UPnP device 210.

Step 62: The UPnP device 210 receives the request and sends the device description back to the HTTP proxy 216.

Step 63: The HTTP proxy 216 forwards the device description to the HTTP proxy 226 via the link 201.

Step 64: The HTTP proxy 226 forwards the device description to the UPnP control point 220. Then, the UPnP control point 220 may further obtain the service description contained in the UPnP device 210 following the same steps as above. After obtaining the device and/or service description for the UPnP device 210, the control point 220 is ready to invoke services on the UPnP device 210 by sending an invocation message to the UPnP device 210 and the messages are routed by the HTTP proxies 226 and 216.

Step 65: Periodically, the UPnP device 210 advertises its presence by multicasting a "NOTIFY" message in the first network 200.

Step 66: When the multicast bridge 216 receives the multicast message from the UPnP device 210, the bridge 216 modifies the message "LOCATION" header in the message such that the URL link in the header points to the HTTP proxy 216 instead of the UPnP device 210.

Step 67: The multicast bridge 216 then forwards the modified message over the link 201 to the multicast bridge 224.

Step 68: The multicast bridge 224 modifies the message "LOCATION" header in the message such that the URL in the header points the HTTP proxy 226 instead of the HTTP proxy 216. After such modification, the multicast bridge 224 multicasts the message in the network 218.

Step 69: The UPnP control point 220 receives the modified multicast message from the bridge 224 message, and follows the URL link in the message "LOCATION" header to further send a HTTP request for device descriptions of the UPnP device 210 (as described in steps 59 to 64). Then, the control point 220 may further obtain the service descriptions of the UPnP device 210. After obtaining the device and/or service descriptions, the control point 220 is ready to invoke services on the UPnP device 210 by sending invocation messages to the UPnP device 210, wherein the messages are routed by the HTTP proxies 226 and 216.

For network-to-network remote access, the gateways 212 and 222 are configured such that devices, including any UPnP control points in the second network 218, are directly reachable via a TCP connection by the gateway 212 in the network 200. For example, using VPN, devices on the VPN client side (e.g., the gateway 222) can be directly reachable by the VPN server (e.g., the gateway 212) via the TCP connection. Then, the multicast bridge 224 modifies the multicast search (M-SEARCH) message from the UPnP control point inside the network 218 such that the M-SEARCH message includes an extra header of "Control-Point". The value of this header is the IP address and port number of the UPnP control point from which the M-SEARCH is sent. For example, the M-SEARCH message after modification by the multicast bridge 224 in the gateway 222 of network 218 can comprise:

```
M-SEARCH * HTTP/1.1
Host: 239.255.255.250:1900
Man: ssdp:discover
MX: 3
ST: ssdp:all
Control-Point: 192.168.0.100:32455
```

When the multicast bridge 214 in the gateway 212 of the network 200 receives such a message, the multicast bridge 214 knows where this message comes from, and as a result, when the UPnP devices respond to this message, the multicast bridge 214 in the gateway 212 can send the responses back to the UPnP control point directly.

The present invention also enables existing remote UPnP control points (e.g., on the Internet and/or in other networks) to remotely access devices, services and contents in the private network without modification to UPnP standards. As such, existing UPnP devices can operate without modification within the context of the present invention. Further, multicast forwarding in the private network gateway is not required.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for remote access to a universal plug and play (UPnP) electronic device, comprising:
   providing a proxy in a network including a UPnP device;
   a UPnP control point discovering the UPnP device by sending a discovery message over a communication link to the network;
   providing an address of the proxy to the UPnP control point to enable the UPnP control point to access the UPnP device via the proxy over the communication link; and,
   the proxy providing the UPnP control point access to services and content in the UPnP device in the network over the communication link, by performing message forwarding at a UPnP layer in the network.

2. The method of claim 1 wherein:
   the UPnP control point comprises a standard UPnP control point.

3. The method of claim 2 wherein message forwarding includes utilizing UPnP message forwarding at the UPnP layer.

4. A method of claim 3 wherein:
   the proxy includes a HTTP proxy;
   the method further comprising:
      the UPnP control point establishing a connection to the network via the communication link;
      the UPnP control point conducting discovery of the UPnP device in the network;
      based on the discovery, the UPnP control point sending a device description request to the network; and
      the HTTP proxy receiving the request and forwarding the request to the UPnP device.

5. The method of claim 1 wherein the message forwarding includes performing UPnP SSDP multicast forwarding at the UPnP layer.

6. A method for remote access to a universal plug and play (UPnP) electronic device, comprising the steps of:
   providing a proxy in a network including a UPnP device; and
   the proxy providing access to the UPnP device over a communication link, by performing message forwarding at a UPnP layer in the network;
   whereby a UPnP control point accesses the UPnP device via the proxy over the communication link;

wherein:
the UPnP control point comprises a standard UPnP control point;
providing access further includes providing remote access from the UPnP control point to services and contents in the UPnP device in the network;
wherein the step of message forwarding includes utilizing UPnP message forwarding at the UPnP layer;
wherein:
the proxy includes a HTTP proxy;
the method further comprising the steps of:
the UPnP control point establishing a connection to the network via the communication link;
the UPnP control point conducting discovery of the UPnP device in the network;
based on the discovery, the UPnP control point sending a device description request to the network; and
the HTTP proxy receiving the request and forwarding the request to the UPnP device;
the UPnP control point conducting discovery by sending a search message over the link; and
a multicast bridge receiving the search message and communicating with the UPnP device to determine if the UPnP device is of a type the UPnP control point is searching for, and if so, then the multicast bridge providing an address of the HTTP proxy to the UPnP control point as proxy for access to the UPnP device.

7. The method of claim 6 wherein the step of the multicast bridge communication with the UPnP device further includes the steps of:
the multicast bridge multicasting the search message through the network;
the UPnP device receiving the search message and determining whether it should respond to the request, and if so, the UPnP device responding with a unicast response message; and
the multicast bridge receiving the unicast response message from the UPnP device.

8. The method of claim 7 wherein the step of the multicast bridge determining if the UPnP device is of the type the UPnP control point is searching for further includes the steps of:
based on the response from the UPnP device, the multicast bridge determining if the UPnP control point is searching for a UPnP device, and if so, then the multicast bridge modifying a LOCATION header of the response from the UPnP device such that the header contains a URL link that points to the HTTP proxy; and
the multicast bridge unicasting the modified response to the UPnP control point over the link.

9. The method of claim 8 further comprising the steps of:
the UPnP device periodically multicasting a message indicating its presence in the network;
upon receiving the multicast message from the UPnP device, the multicast bridge modifying the LOCATION header in the message such that the URL link in the header points to the HTTP proxy instead of the UPnP device; and
the multicast bridge forwarding the modified message over the link to the UPnP control point.

10. The method of claim 9 further comprising the steps of:
the UPnP control point receiving the modified message, and following the URL link in the message LOCATION header to request a device description from the HTTP proxy;
the HTTP proxy forwarding the description request to the UPnP device;

the UPnP device sending a description response to the HTTP proxy; and
the HTTP proxy forwarding the description response to the UPnP control point over the link.

11. The method of claim 7 further including the step of:
the multicast bridge receiving the search message from the UPnP control point and recording an IP address and a port number, of the UPnP control point.

12. The method of claim 7 further comprising the step of:
the multicast bridge recording the type of device/service in the search message in a control point list.

13. An apparatus for remote access by a remote universal plug and play (UPnP) control point to a UPnP device in a network, comprising:
a gateway for a network; and
the gateway comprising: (a) a multicast bridge that functions as a bridge between the network and a link established with a UPnP control point, wherein the bridge forwards multicast/unicast messages from the network through the link and vice versa, and (b) a proxy that hides a UPnP device from direct access by the UPnP control point, wherein the proxy provides the UPnP control point access to services and content in the UPnP device in the network over the link, by performing message forwarding at a UPnP layer in the network.

14. The apparatus of claim 13 wherein:
the UPnP control point is configured to establish a connection to the network via the link, and to send a discovery request message to discover the UPnP device in the network; and
the proxy comprises a HTTP proxy that is configured to forward the discovery request message to the UPnP device.

15. An apparatus for remote access by a remote universal plug and play (UPnP) control point to a UPnP device in a network, comprising:
a gateway for the network, wherein the gateway is configured to perform message forwarding at a UPnP layer in the network; and
the gateway comprising: (a) a multicast bridge that functions as a bridge between the network and a link established with the UPnP control point, wherein the bridge forwards multicast/unicast messages from the network through the link and vice versa, and (b) a proxy that hides the UPnP device from direct access by the UPnP control point
wherein:
the UPnP control point is configured to establish a connection to the network via the link, and to send a discovery request message to discover the UPnP device in the network; and
the proxy comprises a HTTP proxy that is configured to forward the discovery request message to the UPnP device;
wherein: the multicast bridge is configured such that upon receiving the discovery request message from the UPnP control point, the multicast bridge communicates with the UPnP device to determine if the UPnP device is of the type that the UPnP control point is searching for, and if so, then the multicast bridge provides an address of the HTTP proxy to the UPnP control point as proxy for access to the UPnP device.

16. The apparatus of claim 15 wherein:
the multicast bridge is configured to communicate with the UPnP device by multicasting the discovery request message through the network;

the UPnP device is configured to receive the multicast message and determining whether the UPnP should respond to the request, and if so responding with a unicast response message; and the multicast bridge is further configured to receive the unicast response message.

17. The apparatus of claim 16 wherein:

the multicast bridge is configured such that, based on the discovery request message from the UPnP control point and the unicast response from the UPnP device, the multicast bridge determines if the UPnP device is of the type that the UPnP control point is searching for; and the multicast bridge is further configured such that, if the UPnP device is of the type that the UPnP control point is searching for, then the multicast bridge modifies a LOCATION header of the response message from the UPnP device to include a URL link that points to the HTTP proxy, and the multicast bridge sends the modified response to the UPnP control point via the link.

18. The apparatus of claim 17 wherein:

the UPnP device is configured to periodically multicast a message in the network indicating its presence in the network;

the multicast bridge is further configured such that upon receiving the multicast message from the UPnP device, the multicast bridge modifies the LOCATION header in the message such that the URL link in the header points to the HTTP proxy instead of the UPnP device; and the multicast bridge is further configured to forward the modified message over the link to the UPnP control point.

19. The apparatus of claim 18 wherein:

the UPnP control point is configured to receive the modified message, and follows the URL link in the message LOCATION header to request a device description from the HTTP proxy;

the HTTP proxy is configured to forward the request to the UPnP device;

the UPnP device is configured to send a response to the HTTP proxy; and the HTTP proxy is configured to forward the response to the UPnP control point over the link.

20. The apparatus of claim 16 wherein the multicast bridge is further configured to record an IP address and a port number of the UPnP control point.

21. The apparatus of claim 16 wherein the multicast bridge is further configured to record, in a control point list, the type of device/service in the discovery request message from the UPnP control point.

22. A system for providing remote access between a remote universal plug and play (UPnP) control device to a UPnP device in a network, comprising:

a UPnP control device;

a gateway in a network including a UPnP device;

wherein the gateway comprises: (a) a multicast bridge configured as a bridge between the network and a link established with the UPnP control device, wherein the bridge forwards multicast/unicast messages from the network through the link and vice versa, and (b) a proxy that hides the UPnP device from direct access by the UPnP control device, wherein the proxy is further configured to provide the UPnP control device access to the UPnP device over the link and to perform message forwarding at an UPnP layer in the network.

23. The system of claim 22 wherein:

the UPnP control device is configured to establish a connection to the network via the link, and to send a discovery request message to discover the UPnP device in the network; and the proxy comprises a HTTP proxy that is configured to forward the discovery request message to the UPnP device.

24. The system of claim 23 wherein:

the multicast bridge is configured such that upon receiving the discovery request message from the UPnP control device, the multicast bridge communicates with the UPnP device to determine if the UPnP device is of the type that the UPnP control device is searching for, and if so, then the multicast bridge provides an address of the HTTP proxy to the UPnP control device as proxy for access to the UPnP device.

25. The system of claim 24 wherein:

the multicast bridge is configured to communicate with the UPnP device by multicasting the discovery request message through the network;

the UPnP device is configured to receive the multicast message and determining whether the UPnP should respond to the request, and if so responding with a unicast message; and the multicast bridge is further configured to receive the unicast response message.

26. The system of claim 25 wherein:

the multicast bridge is configured such that, based on the discovery request message from the UPnP control device and the unicast response from the UPnP device, the multicast bridge determines if the UPnP device is of the type that the UPnP control device is searching for; and the multicast bridge is further configured such that, if the UPnP device is of the type that the UPnP control device is searching for, then the multicast bridge modifies a LOCATION header of the response message from the UPnP device to include a URL link that points to the HTTP proxy, and the multicast bridge sends the modified response to the UPnP control device via the link.

27. The system of claim 26 wherein the multicast bridge is further configured to record an IP address and a port number of the UPnP control device.

28. The system of claim 27 wherein the multicast bridge is further configured to record, in a control point list, the type of device/service in a discovery message from the UPnP control device.

29. The system of claim 28 wherein:

the UPnP device is configured to periodically multicast a message in the network indicating its presence in the network;

the multicast bridge is further configured such that upon receiving the multicast message from the UPnP device, the multicast bridge modifies the LOCATION header in the message such that the URL link in the header points to the HTTP proxy instead of the UPnP device; and the multicast bridge is further configured to forward the modified message over the link to the UPnP control device.

30. The system of claim 29 wherein:
the UPnP control device is configured to receive the modified message, and follows the URL link in the message LOCATION header to request a device description from the HTTP proxy;
the HTTP proxy is configured to forward the request to the UPnP device;
the UPnP device is configured to send a response to the HTTP proxy; and
the HTTP proxy is configured to forward the response to the UPnP control device over the link.

* * * * *